Sept. 22, 1970 J. V. MARTENS 3,530,242

SYNCHRONIZING SYSTEM FOR PCM SYSTEMS

Filed Oct. 12, 1966 3 Sheets-Sheet 1

Inventor
JEAN V. MARTENS
By [signature]
Attorney

Sept. 22, 1970 J. V. MARTENS 3,530,242

SYNCHRONIZING SYSTEM FOR PCM SYSTEMS

Filed Oct. 12, 1966 3 Sheets-Sheet 2

Inventor
JEAN V. MARTENS

By [signature]
Attorney

Sept. 22, 1970 J. V. MARTENS 3,530,242

SYNCHRONIZING SYSTEM FOR PCM SYSTEMS

Filed Oct. 12, 1966 3 Sheets-Sheet 3

Inventor
JEAN MARTENS
By [signature]
Attorney

United States Patent Office 3,530,242

Patented Sept. 22, 1970

3,530,242
SYNCHRONIZING SYSTEM FOR PCM SYSTEMS

Jean Victor Martens, Deurne, Belgium, assignor to International Standard Electric Corporation, New York, N.Y., a corporation of Delaware Filed Oct. 12, 1966, Ser. No. 586,219
Claims priority, application Netherlands, Oct. 21, 1965, 6513602
Int. Cl. H04l 7/00
U.S. Cl. 178—69.5 10 Claims

ABSTRACT OF THE DISCLOSURE

A system for synchronizing local timing pulses to the phase of the incoming PCM signals. A double phase clock generates two pulse trains at a frequency which is an integral multiple of the basic frequency of the PCM signals. These two pulse trains are supplied to two divider stages for generating basic pulse patterns which logically combine with the phases of the two pulse trains to form the local timing pulses. The above dividers are controlled by two logical circuits detecting the early and late transitions of the PCM signals with respect to a central finite tolerance zone. If a late transition is detected, the basic pulse patterns of the dividers and, hence, the local timing pulses are delayed by skipping one triggering pulse of the first divider. If an early transition is detected, the basic pulse patterns and the local timing pulses are advanced by coupling a trigger pulse of the first divider to the second divider.

The present invention relates to synchronizing systems and more particularly to synchronizing systems that receive the synchronizing information from the information signal itself rather than requiring the transmission and ultimate reception and separation of a special synchronizing signal interleaved with the incoming information signal.

There are ararngements in the prior art that employ similar synchronizing systems, for instance, U.S. Pat. No. 3,185,963. The system of this patent uses a reversible counter means in conjunction with early and late AND gates to detect the out of phase (early and late) occurrences of the incoming information signal with respect to corresponding pulses of the local timing signal, the phase correction taking place at the instant the reversible counter attains its maximum forward or reverse count. This system, however, does not take into account the magnitude of phase errors so that small and admissible positive or negative phase errors will cause the stepping of the reversible counter to its maximum forward or reverse count and cause superfluous phase corrections. These superfluous phase corrections introduce a phase jitter in the local timing signal and, consequently, in a regenerated information signal, when this synchronizing system is used in a regenerative repeater station. Even for terminal stations this phase jitter constitutes a drawback since the margins of the admissible phase errors have to be reduced for the remaining equipment of the terminal station and, thus, more complicated and more expensive equipment has to be used. Moreover, the correction speed of this synchronizing system is low, since a positive or a negative non-admissible phase error must be repeated many times, i.e., until the reversible counter attains its maximum count in the forward or reverse direction, before a phase correction takes place.

Therefore, an object of this invention is to provide a synchronizing system of the above type which does not present the mentioned drawbacks.

A feature of the synchronizing system of this invention is to provide first means for producing clock pulses having a frequency predeterminedly related to the frequency of the information signal, second means to produce local timing signals having a frequency equal to the frequency of the information signal, third means to produce a first control signal indicating an early occurrence of the information signal with respect to the local timing signals and a second control signal indicating a late occurrence of the information signal with respect to the local timing signal and fourth means responsive to the first and second control signals to control the coupling of the clock pulses to the second means to adjust the time of occurrence of the local timing signals for synchronism with the information signal.

The above mentioned and other features and objects of this invention will become more apparent by reference to the following description taken in conjunction with the accompanying drawings, in which.

Figure 1:
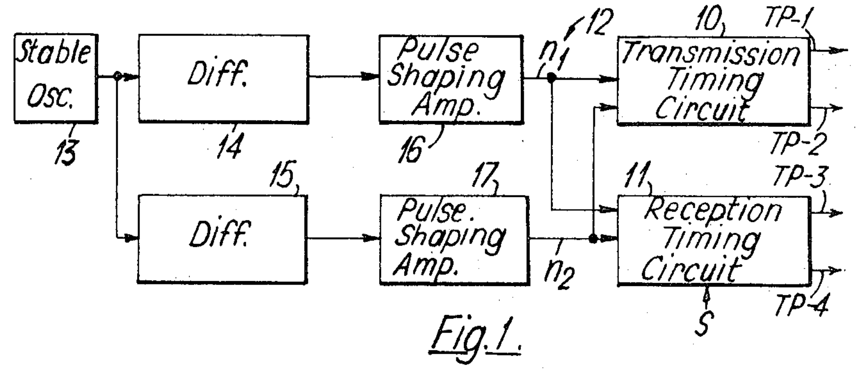
FIG. 1 is a block diagram of a two way pulse code modulation (PCM) communication station having a reception timing circuit incorporating the synchronizing system of this invention.

Referring to FIG. 1, the PCM station is illustrated as comprising a transmission timing circuit 10, a reception timing circuit 11 and a common double pulse clock 12. Clock 12 includes a stable oscillator 13 having a frequency equal to an integral multiple (four times) of the frequency of the incoming signals coupled in parallel to differentiators 14 and 15 which are in turn connected to pulse shaping amplifiers 16 and 17. The outputs $n_1$ and $n_2$ of amplifiers 16 and 17 constitute the clock pulse outputs of the double phase clock 12.

Circuit 10 has two inputs connected to the two outputs $n_1$ and $n_2$ of clock 12 and two timing pulse outputs TP–1 and TP–2 for coupling to the transmission portion of the communication station.

Circuit 11 also has two inputs connected to outputs $n_1$ and $n_2$ of clock 12 and a third input S to which the incoming binary information signal is coupled. The timing pulses for the receiving part of the station are coupled from the two outputs TP–3 and TP–4.

Differentiators 14 and 15 of clock 12 differentiate the positive and negative half periods of the output of oscillator 13, respectively. Amplifier 17 inverts the negative output pulses of differentiator 15 and thus two positive clock pulse trains having 180° phase difference with respect to each other are obtained from the outputs $n_1$ and $n_2$ of amplifiers 16 and 17, respectively.

Before proceeding with the remainder of the description, it should be noted that the negative logic convention is adopted throughout the description. This means that the "1" condition of the various signals correspond to ground and the "0" condition to a positive DC potential, for instance, +6 volts. Since this negative logic convention is employed, the gates employed are NOT-AND gates, or commonly referred to as NAND gates and NAND logic functions will be performed thereby. All of the gates illustrated in FIG. 2 can be resistor transistor logic circuits. One form of NAND gate is an AND gate whose output is coupled to a NOT gate or INVERTER.

The truth table for NAND logic, where Z is the resultant output of two inputs A and B, is as follows:

| A | B | Z |
|---|---|---|
| 0 | 0 | 1 |
| 0 | 1 | 1 |
| 1 | 0 | 1 |
| 1 | 1 | 0 |

The NAND logic of the above truth table may be expanded to cover the situation of three or four inputs by the following statements: (a) if all inputs are "0," $Z$="1"; (b) if all inputs are "1," $Z$="0"; and (c) if one or more inputs are "1" and one or more of the other inputs are "0," $Z$="1."

Figure 2:
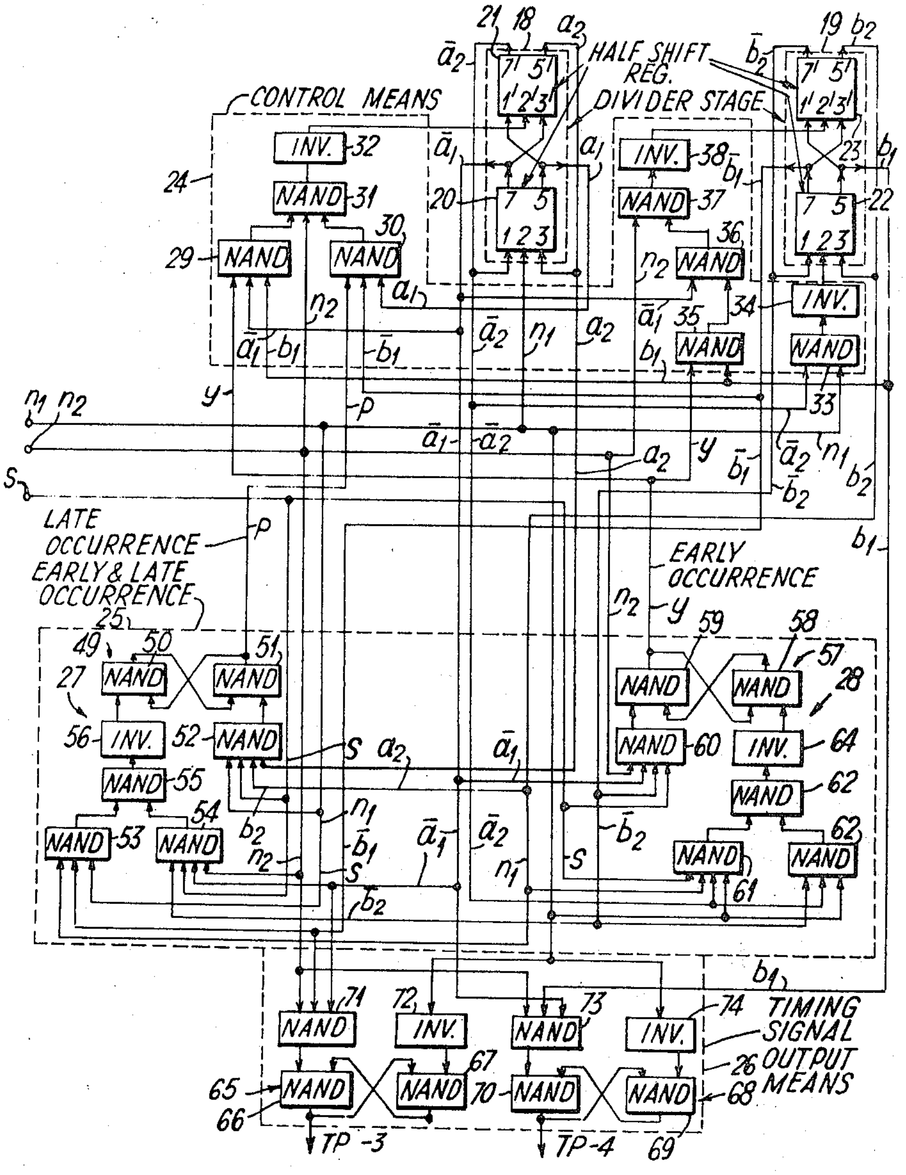
FIG. 2 is a block diagram of the reception timing circuit of FIG. 1 incorporating the synchronizing system of this invention.

Referring to FIG. 2, reception timing circuit 11 is illustrated as including two divider stages 18 and 19. Divider stage 18 includes half shift register 20 and half shift register 21 and divider stage 19 includes half shift register 22 and half shift register 23. The divider stages 18 and 19 are coupled to the $n_1$ and $n_2$ outputs of clock 12 (FIG. 1) and also to a control means 24 which under control of the early and late occurrence detecting means 25 produce triggered pulses which must be "1" for shift registers 21 and 23 of divider stages 18 and 19, respectively. The basic pulse patterns produced by divider stages 18 and 19 are coupled to timing signal output means 26 to generate from these basic pulse patterns and the clock pulses $n_1$ and $n_2$ the timing signals TP–3 and TP–4.

The two logic circuits 27 and 28 of the detecting means 25 are provided to adjust the average frequency and phase of the timing pulses TP–3 and TP–4 to the basic frequency of the incoming information signal S. Logic circuitry 27 produces an output $p$ which indicates a late occurrence of the transitions of the incoming signal S with respect to timing pulse TP–4 and logic circuitry 28 provides an output signal $y$ which indicates an early occurrence of the transitions of the incoming signal S with respect to timing pulse TP–4. The signal $p$ and $y$ are coupled to the control means 24 which enables the skipping of or addition of a trigger pulse coupled to the dividers 18 and 19 when a phase error is detected by the logic circuitry 27 and 28.

Figure 4:
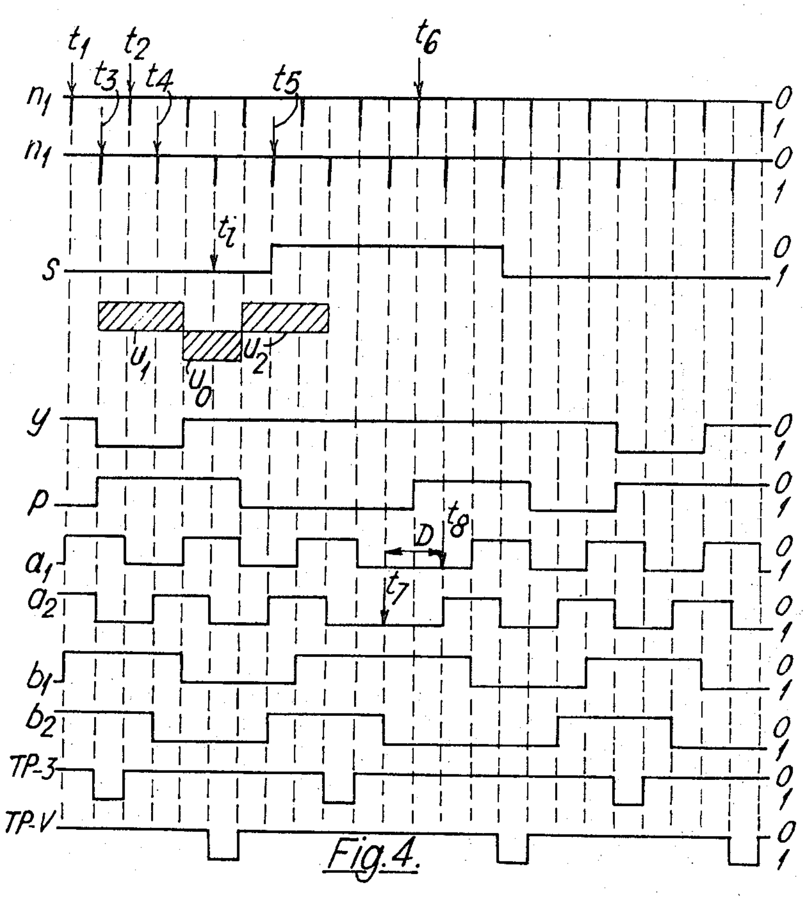
FIGS. 4 and 5 are timing diagrams employed in connection with FIG. 2 to illustrate the operation thereof.
Figure 5:
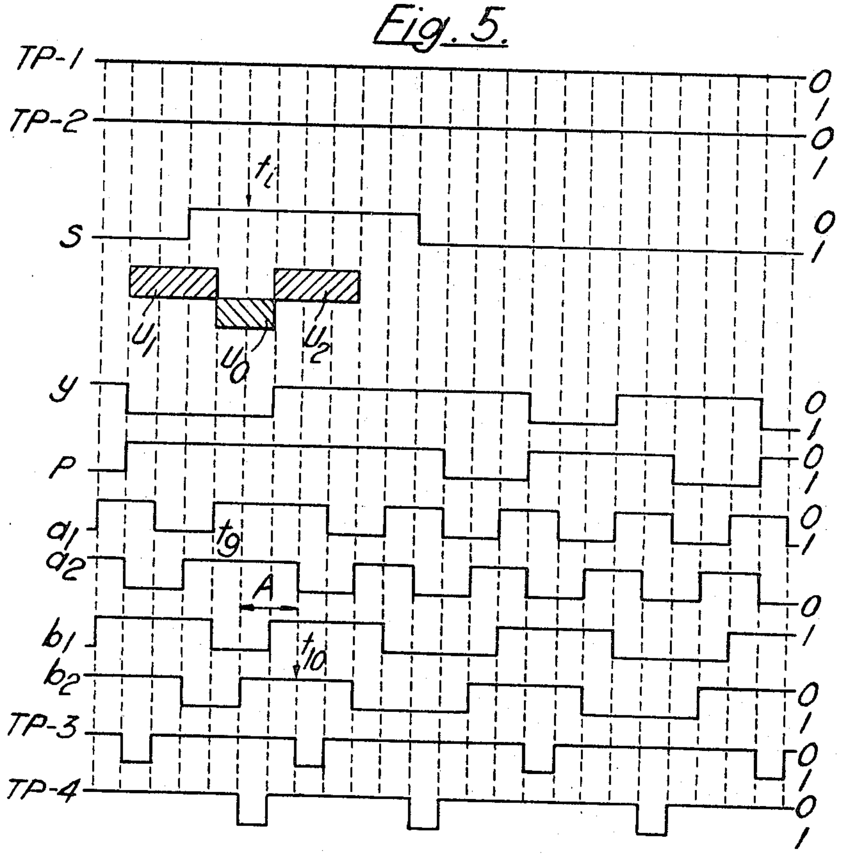

Assuming that the ideal instances of transition of the incoming information signal S coincides with the leading edge of the timing pulse TP–4, as indicated at time $t_1$, FIGS. 4 and 5 the phase relation between the timing pulses TP–3 and TP–4 and incoming signal S is considered to be correct as long as the actual transition instances of signal S occurs in tolerance zone $U_0$ illustrated in FIGS. 4 and 5. This tolerance zone $U_0$ extends to either side of the leading edge of timing pulses TP–4 by a given amount which in the present illustrative example is ±12.5% of the basic digital period of signal S. This tolerance zone $U_0$ is defined by the operation of logic circuitry 27 and 28. There is also provided by logic circuitry 27 and 28 an early zone $U_1$ occurring before tolerance zone $U_0$ and a late zone $U_2$ following tolerance zone $U_0$. In the present descriptive example zones $U_1$ and $U_2$ are symmetrical with zone $U_0$ and they both extend for a distance of 37.5% of the basic digital period of signal S from the respective ends of zone $U_0$.

Turning now to a more detailed description of divider stages 18 and 19, register 20 is triggered by clock pulse $n_1$ while register 21 is triggered by a "1" output of control means 24 provided by the logical combination $$n_2(\bar{y}+a_1+\bar{b}_1)(\bar{p}+\bar{a}_1+b_1)$$

or its equivalent $n_2(\overline{y\bar{a}_1b_1})(\overline{pa_1\bar{b}_1})$, which is formed by NAND gates 29, 30 and 31 and INVERTER 32. Register 22 of stage 19 is triggered by the logical combination $n_1\bar{a}_2$, if a "1" output results, as formed by NAND gate 33 and INVERTER 34. Register 23 of stage 19 is triggered by the logical combination $n_2(a_1+yb_1)$, if a "1" output results, as formed by NAND gates 35, 36 and 37 and INVERTER 38. When appropriately triggered, as described hereinabove, divider stages 18 and 19 provide basic pulse patterns $a_1$, $a_2$, $b_1$, $b_2$ and their complement $\bar{a}_1$, $\bar{a}_2$, $\bar{b}_1$, $\bar{b}_2$, with these various basic pulse patterns and their complements being provided at the indicated terminals of shift registers 20, 21, 22 and 23.

Figure 3:
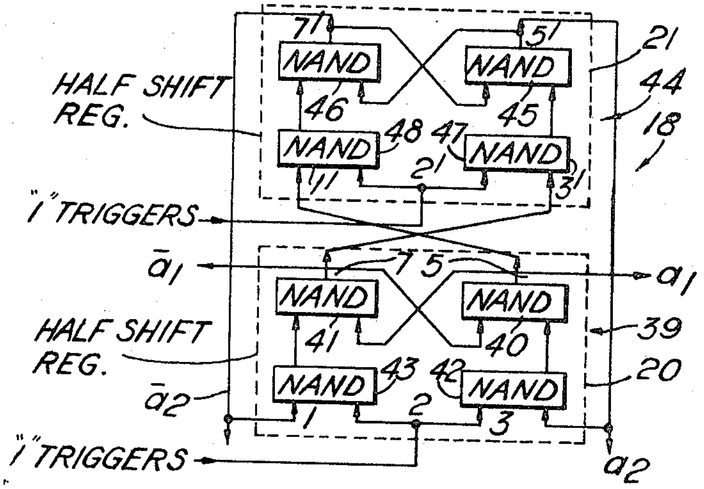
FIG. 3 is a block diagram of a divider stage of FIG. 2.

Referring to FIG. 3, a block diagram of divider stage 18 is illustrated. Register 20 includes flip flop 39 formed from NAND gates 40 and 41 which is triggered into its "0" condition by NAND gate 42 and into its "1" condition by NAND gate 43. Register 21 includes flip flop 44 formed by NAND gates 45 and 46 which is triggered into its "1" condition by NAND gate 47 and into its "0" condition by NAND gate 48. The basic pulse pattern $a_1$ is taken from terminal 5 for use in the remainder of the system. Basic pulse pattern $a_2$ is taken from terminal 5' for use in the remainder of the system and also as an input for NAND gate 42 through terminal 3. It should be noted that terminal 5 is also connected to terminal 1' of NAND gate 48. Complementary basic pulse $\bar{a}_1$ is coupled from terminal 7 for use in the remainder of the system and to terminal 3' as an input to NAND gate 47. Complementary basic pulse pattern $\bar{a}_2$ is coupled from terminal 7' for use in the remainder of the system and to terminal 1 as an input for NAND gate 43.

The arrangement of divider stage 19 is identical to the one illustrated in FIG. 3 and will operate in a manner similar to that to be described hereinbelow with respect to stage 18 but having trigger pulses occurring at different times formed by different logical combinations of the basic pulse patterns, the ouputs of detecting means 25 and the clock pulses.

Referring to FIG. 4 together with FIG. 3, the operation of divider stage 18 will now be described. At time $t_1$ terminal 2 will supply a "1" input to NAND gate 42 with a "0" input being applied thereto at terminal 3 from terminal 5' resulting in an output from NAND gate 42 of "1" which when combined with the "1" output of terminal 7 produces a "0" output at terminal 5. At time $t_2$ a "1" input will appear at terminal 2 for application to NAND gate 43 with a "0" input being coupled to terminal 1 from terminal 7' resulting in a "1" output from NAND gate 43. The "1" output from NAND gate 43 and the "1" output of terminal 5 coupled as inputs to NAND gate 41 produce at terminal 7 a "0" output which due to the flip flop action will produce a "1" output at terminal 5. At time $t_3$ a "1" input will appear at terminal 2' and a "1" output will appear at terminal 3' from terminal 7 to constitute the inputs of NAND gate 47 and resulting in a "0" output from NAND gate 47. This "0" output is an input to NAND gate 45 with the second input thereto being provided from terminal 7' having a "0" condition. With these two inputs NAND gate 45 will produce a "1" output at terminal 5'. At time $t_4$ a "1" input will again appear at terminal 2' to act as one input to NAND gate 48 which receives also a "1" input at terminal 1' from terminal 5 resulting in a "0" output from NAND gate 48. This "0" output is an input for NAND gate 46 together with the "1" output of terminal 5' will produce a "1" output at terminal 7' and due to the flip flop action a "0" output at terminal 5'.

Returning now to the discussion of FIG. 2, logic circuitry 27 includes flip flop 49 formed by NAND gates 50 and 51 which is provided with a trigger-on NAND gate 52 and a reset circuit including NAND gates 53, 54, 55 and INVERTER 56. Logic circuitry 28 includes flip flop 57 formed by NAND gates 58 and 59 which is provided with a trigger-on NAND gate 60 and a reset circuit including NAND gates 61, 62 and 63 and INVERTER 64.

Flip flop 49 is triggered to "1" by the logical combination $n_1a_2b_2$S formed by NAND gate 52 and is reset to the "0" condition by the logical combination $n_2\bar{a}_1\bar{b}_1S+n_1\bar{b}_1b_2$ formed by NAND gates 53, 54 and 55 and INVERTER 56. Flip flop 57 is triggered to "1" by the logical combination $n_2\bar{a}_1\bar{b}_2$S formed by NAND gate 60 and is reset to its "0" condition by the logical combination $n_1\bar{a}_2b_2S + n_1\bar{a}_2\bar{b}_2$ formed by NAND gates 61, 62 and 63 and INVERTER 64.

Output means 26 includes flip flop 65 formed by NAND gates 66 and 67 and flip flop 68 formed by NAND gates 69 and 70. NAND gate 71 forms a trigger pulse for flip flop 65 to trigger to its "1" condition by the logical combination $n_2\bar{a}_1\bar{b}_1$. Flip flop 65 is reset to the "0" output condition by the next succeeding $n_1$ clock pulse which is coupled through INVERTER 72. The operation of this flip flop can be understood by recognizing that at time $t_3$, FIG. 4 the inputs to NAND gate 71 are all "1" resulting in a "0" output. This "0" output is an input for NAND gate 66 having another input from the output of NAND gate 67 which is in a "1" condition thereby producing a "1" condition for TP–3. At the next succeeding $n_1$ clock pulse shown at time $t_2$, FIG. 4 INVERTER 72 will produce a "0" output to provide one input to NAND gate 67 whose other input from the output of NAND gate 66 is a "1" resulting in a "1" output from NAND gate 67 which due to the flip flop action a "0" from NAND gate 66. The triggering of flip flop 68 will be accomplished in the same manner as outlined hereinabove with respect to flip flop 67 remembering that the triggering pulse from NAND gate 73 is derived from a different combination of clock pulses and basic pulse patterns. INVERTER 74 will operate the same as INVERTER 72 to bring about the reset of flip flop 68.

The principle of operation of FIG. 2 will now be described for a condition of synchronization, a condition of late "1" to "0" transitions in signal S with respect to tolerance zone $U_0$ and a condition of early "1" to "0" transitions in signal S with respect to tolerance zone $U_0$. When the "1" to "0" transition of signal S occurs outside of tolerance zone $U_0$, a phase correction of the timing pulse sequences TP–3 and TP–4 takes place so that the succeeding "1" to "0" transitions of signal S occur in tolerance zone $U_0$.

Considering first the condition of syncronization where a "1" to "0" transition of signal S occurs in the tolerance zone $U_0$, such as at time $t_1$, the operation of detector means 25 and control means 24 will be described with reference to FIGS. 2 and 4.

The $p$ output of flip flop 49 will stay in its "0" condition since it cannot be triggered to its "1" condition at the beginning of zone $U_2$. This is due to the fact that signal S equals "0" and the remaining inputs to NAND gate 52 are "1" resulting in a "1" output from NAND gate 52. This "1" output is one output to NAND gate 51 with the other input is a "1" from NAND gate 50 resulting in a "0" output from NAND gate 51. Thus, output $p$ will stay at "0" for the synchronizing time under consideration.

The $y$ output of flip flop 57 will be triggered to "1" at the beginning of zone $U_1$ since all the inputs to NAND gate 60 are "1" resulting in a "0" output therefrom. This "0" output provides one input for NAND gate 59. The second input for NAND gate 59 is a "1" from NAND gate 58 resulting in a "1" output from NAND gate 59. At the end of zone $U_1$ the $y$ output of flip flop 57 will be reset to "0" as follows. All the inputs to NAND gate 61 are "1" resulting in a "0" output. NAND gate 62 will provide "1" output since $\bar{b}_2$ is equal to "0" and the other two inputs are equal to "1." With these two output from NAND gates 61 and 62, NAND gate 63 will produce a "1" output which is inverted by INVERTER 64 to provide a "0" input to NAND gate 58. This input in conjunction with the "1" input from NAND gate 59 produces a "1" output from NAND gate 58 and due to flip flop action a "0" output from NAND gate 59. The $y$ output will stay in this "0" condition for the synchronizing time under consideration.

With the above conditions of the $p$ and $y$ output of detector means 25, a trigger pulse at time $t_5$ is coupled to terminal 2′ of register 21. This trigger pulse is produced by a "1" output from NAND gate 29 generated due to the fact that the $y$ and $\bar{a}_1$ inputs are "0" and the $b_1$ input is "1." NAND gate 30 also produces a "1" output since $p$ and $\bar{b}_1$ are "0" and $a_1$ is "1." The "1" outputs from NAND gates 29 and 30 provide two inputs to NAND gate 31 with the third input being coupled to clock pulse $n_2$ input. With a "1" on all inputs of NAND gate 31, a "0" output results and INVERTER 32 provides a "1" output as the trigger pulse. This "1" output from INVERTER 32 will continue at succeeding trigger times.

Also at time $t_5$ a trigger pulse is coupled to terminal 2′ of register 23. This trigger pulse is produced since the $y$ input of NAND gate 35 is "0" and the $b_1$ is "1" resulting in a "1" output therefrom. This "1" output constitutes one input to NAND gate 36 with the $\bar{a}_1$ input being in the '0" condition resulting in a "1" output from NAND gate 36. This latter "1" output is one input to NAND gate 37 with the second input being provided by clock pulse $n_2$. Thus, there will be two "1" inputs resulting in a "0" output from NAND gate 37 which is inverted by INVERTER 38 to provide the "1" trigger pulse. This trigger pulse will continue being produced at succeeding appropriate times to carry out the overall objective of this timing circuit.

Now the operation of the system of FIG. 2 will be described for a late "1" to "0" transition of signal S which occurs in zone $U_2$ as shown in FIG. 4.

The $p$ output of flip flop 49 is triggered to the "1" state at the start of zone $U_2$ since all the inputs of NAND gate 52 are "1" resulting in a "0" output. This output is coupled to NAND gate 51 together with a "1" input from NAND gate 50 resulting in a "1" output for NAND gate 51. At the end of zone $U_2$ signal $p$ is normally reset to "0" by the normal reset logical combination $n_2\bar{a}_1\bar{b}_2S$. These signals forming the logical combination are coupled to NAND gate 54 and produce a "1" output therefrom since S is "0" and all the other inputs "1." NAND gate 53 will produce a "1" output since the $n_1$ and $b_2$ inputs are "0" and the $\bar{b}_1$ input is "1." The "1" output of NAND gate 54 and "1" output of NAND gate 53 constitute the inputs of NAND gate 55 which provides a "0" output which is inverted in INVERTER 56 to provide a "1" input to NAND gate 50. This input in conjunction with the "1" output of NAND gate 51 produces a "0" output from NAND gate 50 and due to the flip flop action produces a "1" output for $p$. In other words, actually there is no reset at the end of zone $U_2$ since S was "0."

At time $t_6$ signal $p$ will be reset to "0" since NAND gate 53 has all "1" inputs and produce a "0" output and NAND gate 54 produces a "1" output due to all "0" being present at the input thereof. Thus, NAND gate 55 will have a '0" and "1" input resulting in a "1" output which is inverted by INVERTER 56 to provide a "0" input for NAND gate 50. This input in conjunction with the "1" input from NAND gate 51 produces a "1" output from NAND gate 50 and due to the flip flop action a "0" output from NAND gate 51.

The $y$ output of NAND gate 59 is triggered to "1" at the beginning of zone $U_1$ since all the inputs of NAND gate 60 are "1" resulting in a "0" output and one input of NAND gate 59. The other input for NAND gate 59 is "1" from NAND gate 58 which results in a "1" output from NAND gate 59. The $y$ signal is reset to "0" at the end of zone $U_1$ since NAND gate 61 produces a "0" output due to all the inputs thereto being "1." NAND gate 62 produces a "1" output since the $\bar{b}_2$ input is "0" and the other two inputs are "1." NAND gate 63 responds to the "0" output of NAND gate 61 and the "1" output of NAND gate 62 to produce a "1" output which is inverted by INVERTER 64 to provide as one input to NAND gate 58 a "0." The other input is a "1" from NAND gate 59 resulting in a "1" output and due to the flip flop action a "0" output from NAND gate 59.

With these conditions of signals $p$ and $y$ from detecting means 25, the action of the control means will now be described with reference to time $t_7$. NAND gate 29 produces a "1" output since all the inputs thereto are "0." This constitutes the first input to NAND gate 31. The second input to NAND gate 31 is $n_2$ which is in a condition of "1." The third input is provided by NAND gate 30 which produces a "0" output since all the inputs thereto are "1." Thus, NAND gate 31 has two "1" inputs and one "0" input resulting in a "1" output which is inverted by INVERTER 32 to produce a "0" output which constitutes no trigger pulse for register 21. Thus, the trigger pulse at time $t_7$ is blocked. At time $t_8$ NAND gate 29 will produce a "1" input to NAND gate 31 due to all "0" inputs thereto. NAND gate 30 will produce a "1" input for NAND gate 31 since the $p$ input to NAND 30 is "0" and the other two inputs are "1." The "1" condition of clock pulse $n_2$ together with the "1" from NAND gates 29 and 30 results in a "0" output from NAND gate 31 which is inverted to a "1" trigger pulse by INVERTER 32. As a consequence of this operation of blocking a trigger pulse at time $t_7$ all the basic pulse patterns $a_1$, $a_2$, $b_1$, and $b_2$, as well as their complements, are delayed, as indicated at D, FIG. 4, by 25% of the basic digital period of signal S with this delay being transferred through the operation of the output means 26 to the timing of the timing pulses TP–3 and TP–4.

Turning now to the condition where the "1" to "0" transitions of signal S occurs in zone $U_1$, the operation of detecting means 25 and control means 24 will now be described with reference to FIGS. 2 and 5.

Signal $p$ from flip flop 49 is normally triggered to its "1" condition at the beginning of zone $U_2$ but this fails due to signal S being in the "0" condition. This is demonstrated by noting that NAND gate 52 produces a "1" output due to the presence of a mixture of "1" and "0" inputs thereto. This "1" output coupled to NAND gate 51 together with the "1" input thereto from NAND gate 50 produces a "0" output from NAND gate 51. This condition of signal $p$ will remain for the detection interval of concern.

The $y$ output of flip flop 57 is triggered to "1" at the beginning of the $U_1$ zone as described hereinabove with respect to the late transition of signal S. Signal $y$ is normally reset at the end of zone $U_1$ but this fails in this situation for the following reasons. NAND gate 61 produces a "1" output due to S being "0" and the remaining inputs being "1." NAND gate 62 produces a "1" output since $\overline{b}_2$ is "0" and the other inputs are "1." With the "1" outputs being coupled from NAND gates 61 and 62 as inputs to NAND gate 63 there results a "0" output which is inverted by INVERTER 64 to provide a "1" input for NAND gate 58. This input in conjunction with the "1" input from NAND gate 59 produces a "0" output from NAND gate 58 resulting in no triggering of NAND gate 59 to its "0" condition.

At the end of the tolerance zone $U_0$ reset will occur in the following manner. NAND gate 61 will produce a "1" output due to a mixture of "0" and "1" inputs and NAND gate 62 will produce a "0" output since all inputs are "1." The "1" output from NAND gate 61 and the "0" output from NAND gate 62 provides the inputs for NAND gate 63 which provides a "1" output. This output is inverted by INVERTER 64 to provide a "0" input to NAND gate 58 which together with the "1" input from NAND gate 59 causes a "1" output from NAND gate 58 and due to flip flop action a "0" output from NAND gate 59.

With the above-described conditions of signals $p$ and $y$, control means 24 operates in the following manner. The normal trigger pulse to terminal 2' of register 21 is not produced at time $t_9$ for the following reasons. NAND gate 29 produces a "0" output due to all "1" inputs and NAND gate 30 produces a "1" output due to all "0" inputs. The outputs of NAND gates 29 and 30 together with the "1" condition of the clock pulse $n_2$ produces a "1" output from NAND gate 31 which is inverted in INVERTER 32 to provide a "0" output and, hence, no trigger pulse.

However, at time $t_9$ the coincident $n_2$ clock pulse is used to trigger register 23 in the following manner. NAND gate 35 produces a "0" output due to all inputs being "1." NAND gate 36 produces a "1" output since $\overline{a}_1$ is "1" and the output of NAND gate 35 is "0." NAND gate 37 produces a "0" output since the input from NAND gate 36 is "1" and the $n_2$ clock pulse at time $t_9$ is "1" resulting in a "0" output which is inverted by INVERTER 38 to provide the required "1" trigger pulse for register 23.

As a consequence of the above operation, all the basic pulse patterns $a_1$, $a_2$, $b_1$, $b_2$ and their complementary basic pulse patterns are advanced by 25% of the basic digital period of the information signal S from time $t_{10}$ (the usual triggering time for register 23) to time $t_9$ as indicated by A in FIG. 5. With the basic pulse patterns being advanced, the timing of the timing pulses TP–3 and TP–4 are also advanced due to the operation of output means 26.

If the "1" to "0" transition of signal S considered hereinabove was out of phase with respect to the limits of the tolerance zone $U_0$ by more than ±25% of the basic digital period of signal S, it is obvious that only one correction would not be sufficient to restore phase synchronism. The desired phase synchronism would be completed by a second phase correction at the next "1" to "0" transition of signal S. It is also obvious that flip flops 49 and 57 and their associated gating means of FIG. 2 could easily be designed to detect the late and early occurrences of the "0" to "1" transitions of signal S, or one flip flop, such as flip flop 49, could detect the late occurrences of the "1" to "0" signal transitions while flip flop 57 could detect the early occurrences of the "0" to "1" signal transitions. It is also possible to double the above detecting circuit to enable the detection of the late and early occurrences of both the "1" to "0" and "0" to "1" signal transitions.

Further, it should be noted that the pulse length and the relative phase of timing pulses TP–3 and TP–4 are determined by the operation of the logic circuitry very accurately. This is an important feature because the operation of the entire PCM system depends on the correct shape and phase of timing pulses TP–3 and TP–4.

While I have described above the principles of my invention in connection with specific apparatus it is to be clearly understood that this description is made only by way of example and not as a limitation to the scope of my invention as set forth in the objects thereof and in the accompanying claims.

I claim:

1. A system for synchronizing local timing signals with an incoming information signal comprising:

a source of information signal;

first means for producing clock pulses having a frequency predeterminedly related to the frequency of said information signal;

second means coupled to said first means to produce said local timing signals having a frequency equal to the frequency of said information signal;

third means coupled to said source, the output of said second means and directly to the output of said first means to produce a first control signal indicating an early occurrence of said information signal with respect to said local timing signals and a second control signal indicating a late occurrence of said information signal with respect to said local timing signals; and fourth means coupled to said first means, said second means and said third means responsive to said first and second control signals to control the coupling of said clock pulses to said second means to adjust the time of occurrence of said local timing signals for synchronism with said information signal.

2. A system for synchronizing local timing signals with an incoming information signal comprising:
a source of information signal;
first means for producing clock pulses having a frequency predeterminedly related to the frequency of said information signal;
second means coupled to said first means to produce said local timing signals having a frequency equal to the frequency of said information signal;
third means coupled to said source, said first means and said second means to produce a first control signal indicating an early occurrence of said information signal with respect to said local timing signals and a second control signal indicating a late occurrence of said information signal with respect to said local timing signals; and
fourth means coupled to said first means, said second means and said third means responsive to said first and second control signals to control the coupling of said clock pulses to said second means to adjust the time of occurrence of said local timing signals for synchronism with said information signal;
said second means including
a fifth means to produce basic pulse patterns having a frequency predeterminedly related to the frequency of said clock pulses, and
sixth means coupled to said first means and said fifth means responsive to said clock pulses and selected ones of said basic pulse patterns to produce said local timing signals.

3. A system according to claim 2, wherein said fifth means includes at least two cascade coupled divider means.

4. A system according to claim 3, wherein said fourth means includes
first logic circuitry coupled to the first of said divider means, said third means and said first means responsive to said clock pulses, certain ones of said basic pulse patterns and said first and second control signal to produce first trigger pulses and control the coupling thereof to said first of said divider means, and
second logic circuitry coupled to said first of said divider means, the second of said divider means, said third means and said first means responsive to said clock pulses, certain ones of said basic pulse patterns and said first control signal to produce second trigger pulses and control the coupling thereof to said second of said divider means.

5. A system according to claim 4, wherein
said third means detects a late occurrence of said information signal; and
said first logic circuitry is controlled by said second control signal to produce said first trigger pulses at a time delayed with respect to the time of normal production of said first trigger pulses to delay the operation of said first and second divider means.

6. A system according to claim 4, wherein
said third means detects an early occurrence of said information signal; and
said first and second logic circuitry are controlled by said first control signal to block the coupling of at least one of said first trigger pulses to said first divider means and to trigger said second divider means by said one of said first trigger pulses to advance the operation of said first and second divider means.

7. A system according to claim 4, wherein said third means includes
third logic circuitry coupled to said source, said first means and both said divider means responsive to said information signal, said clock pulses and certain ones of said basic pulse patterns to produce said first control signal, and
fourth logic circuitry coupled to said source, said first means and both said divider means responsive to said information signal, said clock pulses and certain ones of said basic pulse patterns to produce said second control signal.

8. A system according to claim 7, wherein said third and fourth logic circuitry each include
a bistable circuit, and
a plurality of logic gates coupled to said bistable circuit, said source, said first means and both said divider means responsive to said information signal, said clock pulses and certain ones of said basic pulse patterns to produce trigger and reset pulses to control said bistable circuit for the production of the associated one of said first and second control signals.

9. A system according to claim 4, wherein said sixth means includes
a bistable circuit for each of said local timing signals, and
logic gate circuits coupled to each of said bistable circuit, said first means and both said divider means responsive to said clock pulses and certain ones of said basic pulse patterns to produce trigger and reset pulses to control each of said bistable circuits for production of said local timing pulses.

10. A system for synchronizing local timing signals with an incoming information signal comprising:
a source of information signal;
first means for producing clock pulses having a frequency predeterminedly related to the frequency of said information signal;
second means coupled to said first means to produce said local timing signals having a frequency equal to the frequency of said information signal;
third means coupled to said source, said first means and said second means to produce a first control signal indicating an early occurrence of said information signal with respect to said local timing signals and a second control signal indicating a late occurrence of said information signal with respect to said local timing signals; and
fourth means coupled to said first means, said second means and said third means responsive to said first and second control signals to control the coupling of said clock pulses to said second means to adjust the time of occurrence of said local timing signals for synchronism with said information signal;
said third means including
first logic circuitry coupled to said source, said first means and said second means, and
second logic circuitry coupled to said source, said first means, and said second means,
said first and second logic circuitry cooperating to define a tolerance interval with respect to said local timing pulses in which said information signal should occur for synchronism,
said first logic circuitry producing an error detected portion of said first control signal when said information signal occurs earlier than said tolerance interval, and
said second logic circuitry producing an error detected portion of said second control signal when said information signal occurs later than said tolerance interval.

References Cited

UNITED STATES PATENTS

| | | | |
|---|---|---|---|
| 2,843,669 | 7/1958 | Six et al. | 178—69.5 |
| 3,080,452 | 3/1963 | Rudolph et al. | 178—69.5 |
| 3,147,342 | 9/1964 | Chojnowski et al. | 178—69.5 XR |

ROBERT L. GRIFFIN, Primary Examiner
R. P. LANGE, Assistant Examiner